United States Patent [19]
Otocka

[11] 3,802,912
[45] Apr. 9, 1974

[54] SURFACE TREATMENT OF POLYMERS WITH SALT-FORMING CROSSLINKING AGENTS

[75] Inventor: Edward Paul Otocka, Berkeley Heights, N.J.

[73] Assignee: Bell Telephone Laboratories, Incorporated, Murray Hill, N.J.

[22] Filed: Apr. 10, 1972

[21] Appl. No.: 242,791

Related U.S. Application Data

[63] Continuation of Ser. No. 4,048, Jan. 19, 1970, abandoned.

[52] U.S. Cl................117/118, 117/138.8 UA, 260/94.9 GA
[51] Int. Cl............ C08d 1/28, C08f 1/88
[58] Field of Search... 117/118, 62.2, 62.1, 138.8 E, 117/138.8 UA; 260/94.9 GA, 94.7 N

[56] References Cited
UNITED STATES PATENTS
2,416,060   2/1947   McAlevy et al............ 260/94.9 GO
3,297,471   1/1967   Trauman........................ 117/118

Primary Examiner—Douglas J. Drummond
Assistant Examiner—Michael Ball
Attorney, Agent, or Firm—G. S. Indig

[57] ABSTRACT

A variety of polymeric materials are surface crosslinked to improve various physical and chemical properties. Crosslinking is accomplished by forming ionic bonds between two salt-forming ingredients; the first included as a substituent on the polymer chain and the second acting as an external crosslinking agent. Crosslinking is accomplished by wetting the polymer surface with a liquid containing the crosslinking agent.

13 Claims, No Drawings

SURFACE TREATMENT OF POLYMERS WITH SALT-FORMING CROSSLINKING AGENTS

CROSS REFERENCE TO RELATED APPLICATION

This application is a continuation of my copending application, Ser. No. 4,048 filed Jan. 19, 1970, now abandoned.

BACKGROUND OF THE INVENTION

1. Field of the Invention

The invention relates to surface treatment of polymers including homopolymers and the various types of copolymers as well as blends containing either of those.

2. Prior Art

Polymer products having modified surface properties are desirable for many uses. This is desirable, for example, in dielectric applications where bulk properties are to be maintained through the body but where environmental conditions or handling conditions require modification of physical properties at the surface. An example is a primary insulated cable where the insulating properties are appropriate but where the polymer does not have the ruggedness for pulling through conduit.

While various approaches have been made for preparation of such a product, perhaps the most common involves irradiation. This procedure contemplates bombardment of the finished product usually with charged particles although sometimes with uncharged particles. Polymer bonds are so broken, and on reformation some crosslinking results. This type of procedure requires relatively expensive, sometimes dangerous, high energy apparatus.

Another procedure involves treatment with chemical crosslinking agents such as peroxides in the instance of polyethylene or gaseous diisocyanate in the instance of nylon used for tire cord. This latter procedure, however, is more commonly applied to alter bulk properties and attempts to limit the reaction to thin surface layers generally are unsuccessful.

SUMMARY OF THE INVENTION

In accordance with the invention, surface alteration of polymer properties is accomplished by a novel crosslinking mechanism. In accordance with this mechanism, polymers to be treated contain as substituents one member of a required pair of ionic salt-forming products. This first member may be an acidic or basic functional group such as for example a carboxylic acid group or an amine group. Crosslinking is accomplished by treating the polymer with a liquid containing the other member of the pair. This second member should be basic if the first member is acidic or acidic if the first member is basic. This second member may contain a metal ion. The liquid may be a solution of a compound containing the second member or a liquid form of the compound. Depth of treatment and the properties of the reacted portion are critically dependent on the number of parameters including concentrations, temperature, time of treatment, etc.

DETAILED DESCRIPTION

1. Composition

Generally, the composition is discussed in terms of:

a. the fundamental polymer product as unreacted, b. the nature of the polymer substituent, and c. the nature of the external agent used to form the ionic crosslink (referred to as the "crosslinking agent").

The amount of substituent is dependent on the desired number of crosslinking bonds. It is assumed that under usual conditions substantially complete reaction takes place within the first half thickness of the penetration depth; and the number of substituent groupings may, therefore, be defined in these terms. For example, where the nature of the substituent is such that it may result in but one crosslinking bond, the amount of substituents is at least equal to the number of crosslinking bonds. Since, for many purposes, a minimum of one crosslinking bond for every 500 carbons of the polymer chain is required to produce discernible results, it is required that there be this minimum number of substituent groupings, i.e., one grouping for each 500 carbons. The maximum number of substituent groupings is to be determined in accordance with practical considerations generally in excess of one bond for every 4 carbons which may result in substantial alteration of the desirable properties of the original (unsubstituted) polymer such as increased dielectric loss, reduced tensile strength, etc.; and this is, therefore, described as a maximum.

The minimum quantity of crosslinking agent is, again, that required to bring about the minimum required amount of crosslinking bonds. However, it will become evident from this disclosure that the crosslinking agent is polyfunctional, i.e., is capable of bonding to two or preferably three or more substituent groupings. Accordingly, it is a general requirement that sufficient crosslinking agent come in contact with the polymer during treatment to produce the said number of crosslinking bonds. In the usual procedure, in accordance with the invention, reaction is sufficiently complete that presence in the minimum amount of crosslinking agent assures production of the requisite number of bonds. Accordingly, as an absolute minimum, the treating liquid should contain a number of crosslinking molecules which are equal to the desired number of bonds defined by the functionality of the agent.

The specific nature of the initial ingredients is now discussed in detail.

a. It has been indicated that polymers may be members of a broad category including both homopolymers, various types of copolymers, and blends. Generally, however, polymeric materials treated in accordance with the invention are primarily hydrocarbon polymers. For these purposes, such polymers are defined as those in which at least 95% of the main chain are carbon. Since the invention is primarily a surface treatment, it is generally assumed that the bulk properties are desirable as unmodified. This normally contemplates a solid polymer which, in turn, suggests a molecular weight of the polymer of at least 5,000. In certain instances, however, where a gelatinous near mass may be tolerated or where the substituent containing polymer is initially present as a coating, this requirement may be avoided. Exemplary polymers are polyethylene, polypropylene, polystyrene, polyvinyl chloride and polymethyl methacrylate.

b. Substituent groupings are, for the purpose of the invention, either acidic or basic. To be compatible with the polymer, they are generally organic. For apparent reasons, particularly where the entire mass of polymer is substituted, the grouping should not be such as to significantly affect the polymer characteristics. Exemplary groupings are the carboxylic acid group (—COOH), the sulfonic acid group (—SO$_3$H), the phosphinic acid group (>PO$_2$H) and the phosphonic acid group (—P(OH)$_2$O). Also, primary, secondary and tertiary amine groups may be used as substituents with the view of forming quaternary ammonium salt bonds for the ionic crosslinked structure. Other groupings which are primarily hydrocarbon by nature are suitable. It is generally considered desirable that molecular weight of such substituents lie within the range of from 14 to 500. The minimum is prescribed by the availability of substituent groups — the maximum by the feasibility of incorporation into the polymer.

c. A crosslinking agent must, as has been stated, be such as to result in an ionic salt product. Basic groups which contain a metal ion are particularly desirable since they form relatively strong ionic bonds and after resist penetration of organic substances into the polymer. Compounds used as crosslinking agents with substituted amine groups should have two or more groups which will form quaternary salt bonds. Examples of such groups are iodine, bromine and chlorine. The primary requirement is, of course, reactivity although it is clear that the nature of the agent should be such as to assure sufficient penetration. The latter requirement satisfies a maximum of molecular weight of the orfer of 1,000.

The treating liquid may consist solely of the crosslinking agent in liquid form or it may consist of a solution. Solvents suitable for such purpose should not produce excessive swelling and should, of course, have sufficient solvent power for the agent to assure reaction under expedient conditions.

2. Processing Conditions

By surface treatment, it is ordinarily contemplated that the modified layer be of the order of from 0.002 to 5.0 mils in thickness. In exemplary systems, in accordance with the invention, penetration sufficient to accomplish this objective may result in reaction times from 1 second to several hours over temperatures of from —80° to 250° C. Where desired, reaction conditions may be altered by changing the pressure, using mixed solvents, using ultrasonic agitation, etc.

EXAMPLES

The following examples have been chosen to illustrate the invention. They are divided into two groups; polyethylene was used in one group of experiments and polymethyl methacrylate in the other group of experiments. Modification in chemical and physical properties for variations in parameters such as concentration, time, solvent and temperature are indicated.

In the first group of experiments the acid functional groups were introduced into the polymer by mixing in various amounts of acrylic acid with the ethylene monomer before polymerization. For purposes of illustration, experiments were carried out on samples with three different concentrations of acrylic acid, namely, 1.3, 3.1 and 5.3 mole per cent acrylic acid. The polymers were formed into a variety of thicknesses and shapes necessary for the various tests to be described below.

Although other basic agents could be used, the trifunctional aluminum isopropoxide is particularly convenient since it is commercially available and reasonably inexpensive. For purposes of illustration, two solvents with widely different solubility and diffusion properties were used, namely, benzene and isopropanol. Benzene is a good swelling agent for this polymer and also dissolves appreciable amounts of aluminum isopropoxide. Isopropanol is a poor swelling agent and dissolves only limited amounts of aluminum isopropoxide.

Samples were treated by wetting their surfaces with solutions of the crosslinking agent for specific amounts of time. In some cases the treatment was carried out at the boiling point of the solution, in other cases at room temperature. The solutions were saturated with a crosslinking agent in these experiments but lower concentrations are possible. For comparison purposes, samples were treated with pure solvent containing no crosslinking agent. After treatment, samples were dried under vacuum at 75°C for 15-20 hours.

Various tests were carried out on the treated and untreated samples in order to characterize the chemical and physical changes brought about by the surface treatment. In one group of tests, the ionically-gelled surface layer was separated from the remaining polymer and several measurements carried out on the surface layer alone. In another group of tests, the treated and untreated specimens themselves were subjected to various measurements. The first group of tests are discussed first and then the second group of tests.

The chemical properties of the ionically-gelled surface layer and interior of a treated polymer are sufficiently different that they can be separated by chemical means. This is done by extracting the treated sample in condensing xylene for 24 hours. The unaffected polymer is dissolved and the surface layer remains behind. The fact that the surface layer does not dissolve in the condensing xylene shows that its chemical properties have been radically changed from the original polymer and that this surface treatment gives the polymer increased protection against environmental conditions. The thickness of the surface layers can be determined by weighing the samples before and after the extraction process. Also, the surface layer remaining after the extraction is often coherent and thick enough to determine its density in a gradient column. The data obtained from these experiments is summarized in Table I.

These experiments illustrate how changing the conditions of the surface treatment alters the properties of the surface layer. For example, the data shows that the density of the surface layer depends predominantly on the mole per cent of acrylic acid in the polymer and is less affected by the amount of time that the polymer is exposed to reagent solution or the thickness of the surface layer. The density of the layer is a measure of the concentration of crosslinking bonds. The surface layer thickness is increased by increasing the time that the polymer is exposed to the reagent solution. These results are consistent with the theory that the crosslinking process is rate limited by the diffusion of solution into the surface and that the initial reaction forming the ionic crosslinking bonds is rapid, although not necessarily complete with solvents containing a low concentration of crosslinking agent.

The data in Table I also shows that with low concentration of acid groups the thickness of the surface layer increases more rapidly than with higher concentrations. The greater crosslinking density of the more concentrated samples reduces the rate that the solution can diffuse into the polymer. Thus, the thickness of the surface layer formed in a given amount of reaction time is reduced.

In summary, density of crosslinking bonds is increased by increasing the concentration of salt-forming groups; layer thickness is increased by exposing the polymer to the solution for a longer time.

TABLE I

GEL LAYER THICKNESS

| Copolymer (mole % acrylic acid) | Solvent* | Temp. (°C) | Time (sec) | Thickness (mils) | Density (gm/cc) |
|---|---|---|---|---|---|
| 1.3 | I | 82 | 60 | .266 | .944 |
| | I | 82 | 180 | .529 | .942 |
| | I | 82 | 600 | .980 | — |
| 3.1 | I | 82 | 180 | .350 | .968 |
| | I | 82 | 360 | .512 | — |
| | I | 82 | 600 | .600 | .960 |
| 5.3 | I | 82 | 60 | .098 | .990 |
| | I | 82 | 180 | .175 | — |
| | I | 82 | 600 | .258 | .980 |
| | B | 25 | 600 | .155 | .980 |

* I = Isopropanol
B = Benzene

Some of the changes in the chemical bonding on the surface of the polymer due to this process can be determined and characterized by a spectroscopic technique known as Attenuated Total Reflectance (ATR) Infrared Spectroscopy. This technique probes approximately one micron into the surface of the material. Measurements were made of the 1,800–1,400 cm$^{-1}$ portion of the ATR spectrum on both treated and untreated 3.1 mole per cent polymer. The particular value of this spectroscopic technique is that the —COOH group absorbs at a frequency (1,705 cm$^{-1}$) different from that of the —COO$^-$ group (1,570 cm$^{-1}$). For this reason, the ATR spectrum can be used to determine the extent that acid groups are converted to salt groups under given surface-treatment conditions. These measurements show that when refluxing isopropanol is used as the solvent in the surface treatment process, conversion of acid groups to salt groups is low and increases only slowly with immersion time. On the other hand, when benzene is used as the solvent either at its boiling temperature or room temperature, conversion is much more rapid and complete. The greater swelling power of benzene and concentration of crosslinking agent in benzene as compared to isopropanol is undoubtedly responsible for the greater rate and completeness of conversion of acid groups to salt groups. It should be recognized that the above experimental results tend to characterize the surface treatment process but one solvent is not necessarily superior to the other for a particular application. For example, the isopropanol solvent leads to a thicker layer even though the conversion is not as great as with benzene.

In a second group of tests, the treated and untreated samples themselves were examined. One advantage of the present process over the prior art is that the altered surface area can be made thicker because of solvent diffusion into the polymer. For this reason, some tests were carried out to determine the effect of the surface treatment on the bulk mechanical properties of the polymer. Treated and untreated samples of the 5.3 mole per cent acid copolymer were used in these tests.

Tensile-strength tests were performed according to ASTM D 1708 and the results are summarized in Table II. In general, the treatment increases both modulus and strength and under certain conditions (i.e., benzene solvent at 25°C), the improvement in these properties if substantial. The treatment conditions were not optimum so that greater improvements are undoubtedly possible.

TABLE II

TENSILE TEST RESULTS — 5.3 mole per cent ACRYLIC ACID COPOLYMER*

| Treatment | Young's Modulus (psi) | Yield Strength (psi) | Break Strength (psi) |
|---|---|---|---|
| None Controls | 8,350 | 1,120 | 3,385 |
| (Solvent but no Al(OC$_3$H$_7$)$_3$) | 8,750 | 1,160 | 3,450 |
| B**-Al(OC$_3$H$_7$)$_3$/ 5 sec/80°C | 7,800 | 1,170 | 3,593 |
| B**-Al(OC$_3$H$_7$)$_3$/ 300 sec/25°C | 10,514 | 1,193 | 3,990 |
| I**-Al(OC$_3$H$_7$)$_3$/ 60 sec/82°C | 8,875 | 1,170 | 3,600 |

* Sample dimensions .187" × .128"
** B = Benzene
I = Isopropanol

The surface treatment described above also improves the adhesive properties of polymer surfaces. Tests were carried out on 3.1 mole percent acid polymer. Single lap shear adhesive joint specimens were made by laminating treated and untreated thin films of polymer between steel using a conventional epoxy adhesive cured at 60°C. The results are given in Table III. These tests indicate that treatment with isopropanol solution increases the adhesive joint strength but hot benzene is too strong a swelling agent and does not improve the adhesive properties of the surface. Again, optimum conditions have not been determined for this application.

TABLE III

SINGLE LAP SHEAR TESTS ON LAMINATED JOINTS 3.1% ACID COPOLYMER

| Treatment Solvent*/Time/Temperature | Joint Strength (psi) |
|---|---|
| Control | 2,200 |
| B-Al(OC$_3$H$_7$)/1 sec/80°C | 1,680 |
| B-Al(OC$_3$H$_7$)/2 sec/80°C | 1,613 |

TABLE III-Continued

SINGLE LAP SHEAR TESTS ON LAMINATED JOINTS 3.1% ACID COPOLYMER

| Treatment | Joint Strength |
|---|---|
| I-Al(OC$_3$H$_7$)/60 sec/82°C | 2,450 |
| I-Al(OC$_3$H$_7$)/180 sec/82°C | 2,500 |

* I = Isopropanol
B = Benzene

The surface treatment also reduces the coefficient of friction of the polymer surface which is of value in some applications. This is illustrated in Table IV where the coefficient of friction at various loads is given for treated and untreated samples. The reduction in coefficient of friction is quite large.

these experiments are not optimum and further improvements are undoubtedly possible.

Tests of ordinary tensile strength were also carried out on treated and untreated polymer samples like those treated above. Tensile strength is often limited by cracking at the surface and it was of interest to determine if tensile strength is increased by surface treatment and if this is due to increased elongation or increased bulk modulus. The tensile strength of the untreated polymer was 11,300 pounds per square inch with elongation of 4.56 per cent; that of the treated polymer was 11,867 pounds per square inch with elongation of 4.96 per cent. The polymer was treated with a one mole per cent solution of Al(OC$_3$H$_1$)$_3$ in benzene at 25°C. The treated polymer had greater tensile strength due to greater elongation permitted by its greater surface strength.

TABLE IV

SURFACE TREATMENT AND FRICTION COEFFICIENT

| POLYMER | FRICTION COEFFICIENT[a] AT LOAD | | | | | |
|---|---|---|---|---|---|---|
| | 100 gm | | 200 gm | | 400 gm | |
| | Static | Plateau | Static | Plateau | Static | Plateau |
| Ethylene Acrylic Acid Copolymer (3.1% acid) | | | | | | |
| Untreated | 9.0 | 4.8 | 7.0 | 4.0 | 5.0 | 3.5 |
| Treated | 0.7 | 0.7 | 1.2 | 1.2 | 1.0 | 1.0 |
| Ethylene Acrylic Acid Copolymer (5.3% acid) | | | | | | |
| Untreated | 8.2 | 4.1 | 6.6 | 4.5 | 4.6 | 3.6 |
| Treated[b] | 0.6 | 0.6 | 1.4 | 1.4 | 0.5 | 1.6 |

[a]The load is not given per unit area because the exact contact area is indeterminable. The resistance to motion passes through a maximum (static) and falls to a lower stable value (plateau).
[b]Treated with a solution of aluminum isopropoxide in benzene for 10 minutes at 25°C.

In the second group of examples, polymethylmethacrylate was used as the parent polymer and the salt-forming group was introduced into the polymer by mixing in small amounts of methacrylic acid with the parent monomer before polymerization. The concentration of methacrylic acid was 5 mole per cent. Tests were carried out to ascertain the effect of the surface treatment on the environmental stress cracking resistance of the polymer. The surface treatment consisted essentially of exposing the surface of the polymer to a benzene solution saturated with aluminum isopropoxide at 30°C for various amounts of time. The environmental stress cracking tests were carried out using the cantilever beam method and ethanol was used as the stress cracking agent. The untreated polymer stress cracked at 2,500 pounds per square inch, the polymer treated for 30 seconds stress cracked at 2,770 pounds per square inch and for 60 seconds at 2,960 pounds per square inch. This series of experiments shows that the surface treatment improves the polymer's resistance to environmental stress cracking. The conditions given in

What is claimed is:

1. A method of producing surface modified addition polymers containing at least 95 percent carbon atoms in the main chain so as to obtain an ionic crosslinked surface structure comprising the steps of:
   A. introducing a monomeric material into a chamber, said monomeric material including monomers containing a first member of a required pair of salt-forming ingredients so as to obtain a uniform mixture;
   B. polymerizing said monomeric material so as to obtain an unmodified polymer with a random distribution of the said first members; and
   C. wetting a surface of the unmodified polymer with a liquid containing a second member of the required pair of salt-forming ingredients in which the second member is at least trifunctional so as to obtain a polymer with ionic crosslinking randomly distributed on the surface of the polymer.

2. Method of claim 1 in which the member included in the body of the polymer is selected from the group consisting of the carboxylic acid group, the sulfonic acid group, the phosphinic acid group and the phosphonic acid group.

3. Method of claim 2 in which the member included in the body of the polymer is the carboxylic acid group.

4. Method of claim 1 in which the liquid used to treat the polymer surface contains an aluminum ion.

5. Method of claim 4 in which the liquid used to treat the polymer contains aluminum isopropoxide.

6. Method of claim 1 in which the liquid used to treat the surface of the polymer is an organic solution of aluminum isopropoxide.

7. Method of claim 6 in which the treatment time is between 1 second and 1 hour.

8. Method of claim 1 in which a quaternary ammonium salt is formed on the surface of the polymer.

9. Method of claim 1 in which the member included in the body of the polymer is an amine group.

10. Method of claim 9 in which the liquid used to treat the polymer contains compounds with two or more substituents selected from the group consisting of iodine, bromine and chlorine.

11. Method of claim 1 in which the polymer is a homopolymer.

12. Method of claim 11 in which the polymer is polyethylene.

13. Method of claim 12 in which up to 5.3 mole per cent of acrylic acid is mixed with ethylene before polymerization.

* * * * *